April 9, 1935. B. HENRICKSEN Re. 19,523

ELECTRICALLY DRIVEN DUMB WAITER, ETC

Original Filed Dec. 22, 1932 3 Sheets-Sheet 1

Inventor

Bjarne Henricksen

By Ramsey & Kent

Attorneys

April 9, 1935. B. HENRICKSEN Re. 19,523

ELECTRICALLY DRIVEN DUMB WAITER, ETC

Original Filed Dec. 22, 1932 3 Sheets-Sheet 2

Bjarne Henricksen
INVENTOR.

BY Ramsey + Kent
ATTORNEYS.

April 9, 1935. B. HENRICKSEN Re. 19,523

ELECTRICALLY DRIVEN DUMB WAITER, ETC

Original Filed Dec. 22, 1932 3 Sheets-Sheet 3

Inventor

Bjarne Henricksen

By Ramsey & Kent Attorneys

Reissued Apr. 9, 1935

Re. 19,523

UNITED STATES PATENT OFFICE 19,523

ELECTRICALLY DRIVEN DUMB WAITER, ETC.

Bjarne Henricksen, North Bergen, N. J., assignor to Sedgwick Machine Works, Incorporated, Poughkeepsie, N. Y., a corporation of New York Original No. 1,923,034, dated August 15, 1933, Serial No. 648,372, December 22, 1932. Application for reissue October 24, 1934, Serial No. 749,865. In Canada February 18, 1933

14 Claims. (Cl. 187—3)

My invention relates particularly to a type of elevator construction for household, restaurant, store, office and factory use, commonly termed dumbwaiters, but which may be used for carrying either freight or passengers.

Among the general objects of the invention are to impart to an elevator construction characteristics of low cost, simplicity, safety, reliability, facility of manufacture, and ease and speed of installation.

A special object is to provide a construction of this character which can be driven by a simple type of non-reversing motor without the use of reversing mechanism.

Another object is to provide mechanism especially adapted to serve two landings.

Another object is to provide an installation which can be operated with a minimum sized power unit.

Another object is to provide a simple installation which avoids the necessity for reversing switches.

Another object is to avoid the necessity for over-travel spaces and switches.

Another object is to provide a construction in which the weight of the lift, cage or car (which for convenience will be called a car) assists the motor when starting.

Another object is to provide a simple and self contained construction which can be easily installed by ordinary mechanics.

In the drawings I have illustrated a simple form of apparatus embodying my invention, employing a conventional type of car provided with assembled guides and adapted to be enclosed in a shaft having doors. The car is raised by means of an electric motor and a chain drive which is connected to the car and the motor also controls the lowering of the car. The term "chain" is used to broadly cover a flexible band-like device whether formed of links or a perforated band or a cable, or solid tape or belt with means to prevent slippage.

An automatic brake is provided for stopping the motor and the car and holding them stationary. The starting of the motor and the operation of the brake are controlled by manually operable and automatic switches.

Switch mechanism is preferably arranged on each floor for starting and stopping the motor when desired. Automatic door-controlled switches may also be provided so that the car can not be operated when the doors are open. One of the automatic switch devices is positioned to be actuated by one or more projections carried by the chain. These projections are arranged so as to open the motor circuit and apply the brake when the car arrives near the upper and lower landings or stations.

The switch and the operating projections or cams are so located as to automatically stop the car just before it reaches its lowest position on the down trip and to stop the car just after it has reached its upper limit of travel and started to move down so that the weight of the car when it is stationary is always applying some tension on the driving chain. Consequently when the motor starts to rotate it has practically no gravity load to overcome. The entire structure may be assembled in a framework which can be transported and readily erected at the desired location.

Other advantages will be understood from the following specification and attached drawings, which describe and show an illustrative embodiment of the invention.

Figure 1:
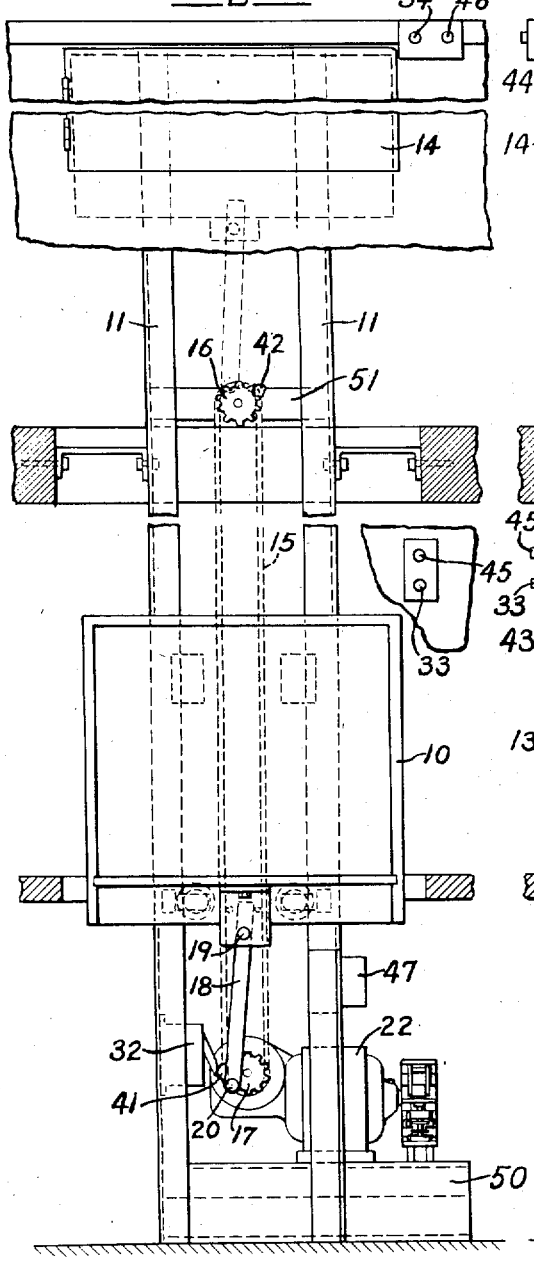
Fig. 1 is a fragmentary front view of an installation involving my invention as applied to a dumb waiter or similar mechanism operating from one floor or landing to another.

The car or lift 10 may be of any suitable construction and guided in any suitable manner by upright rails 11. Usually at least a part of the construction will be enclosed in a shaftway 12 and doors such as 13 and 14 may be provided at the various loading platforms, landings, floors or levels.

In the form shown, a chain 15 is provided for controlling the raising and lowering of the car. This chain travels on guide sprockets 16 and 17 which are suitably supported at the upper and lower parts of the installation. The car is connected to the chain by a rod or bar 18 which is pivoted at 19 to any suitable part of the car and pivoted at 20 to the chain. Stops 21—21 are preferably provided to limit the swinging movement of the connecting rod so that no excessive lateral thrust can be applied to the chain by the weight of the car.

The lower sprocket 17 and the chain are driven by a motor 22 of any suitable type, preferably an electric motor which is adapted to drive in one direction only. The armature or rotating member of the motor may, of course, be suitably geared to the sprocket 17 preferably through a usual worm gear. The motor serves to raise the car and to control its descent.

In order to stop the motor and the chain and car, I provide a suitable form of brake mechanism which includes a brake drum 23 on the armature shaft of the motor.

Brake shoes 24 are carried by levers 25. A spring 26 is adapted to bring the brake shoes into action and an electric solenoid magnet 27 with a core 28 attached to the bar 29 is adapted to retract the brake shoes when the magnet is energized. Any suitable form of brake mechanism might, however, be employed.

The electrical system for controlling the operation of the apparatus includes two contacts 30, 31 of an electro-magnetic switch in the motor circuit, an automatic limit switch 32 and push button or other manually operable starting switches 33 and 34. The movable parts of the switches 30 and 31 are carried by an upright 35 which is normally lifted by spring 36. Springs such as 37 and 38 may provide yielding backings for the movable contacts 30 and 31. The connection 39 in the form of a lever is interposed between the head of the magnet core 28 and the switch plunger 35 so that when the magnet is energized the lever 39 is depressed and the switches 30 and 31 closed, the brakes released and the motor armature free to rotate.

The limit switch 32 may be of any suitable construction and has a movable spring pressed actuating member 40. When this actuator member is projecting, the switch is closed and when the actuator is pressed inwardly the switch is open. The chain 15 is provided with two cams 41 and 42 which are adapted to press the switch actuator 40 inwardly to open the solenoid circuit and stop the motor. The cams and actuator may be designed to stop the motor instantly when either of the cams begins to move the actuator, or a time delay action may be obtained by suitable design and arrangement of the cams and switch actuator.

Door actuated switches 43 and 44 may also be provided so that the apparatus will not operate unless the doors are closed. Such switches are of course well known in this art.

Manually operable emergency stop switches 45 and 46 may also be provided if desired. A main control or entrance switch 47 will also ordinarily be employed.

Figure 2:
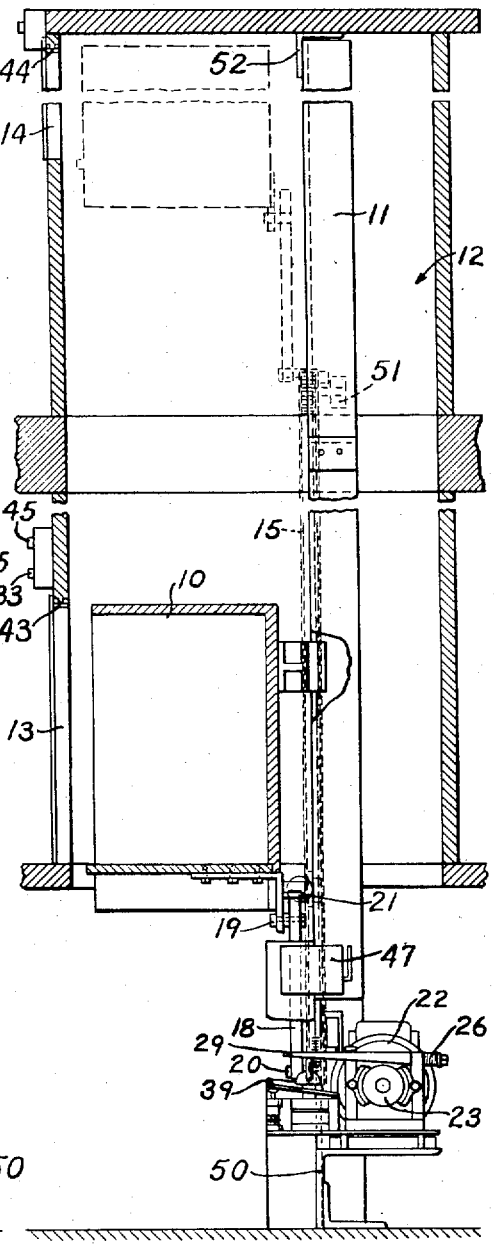
Fig. 2 is a side view and partial section of the same.
Figure 3:
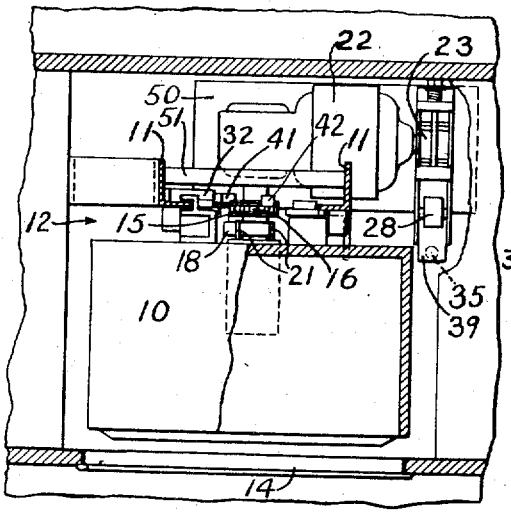
Fig. 3 is a plan view showing the same mechanism, parts being broken away and parts being shown in cross section.
Figure 4:
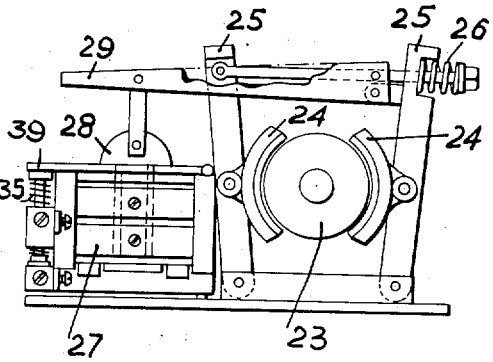
Fig. 4 is a side view showing the brake in the released position and its operating magnet and control switch.
Figure 5:
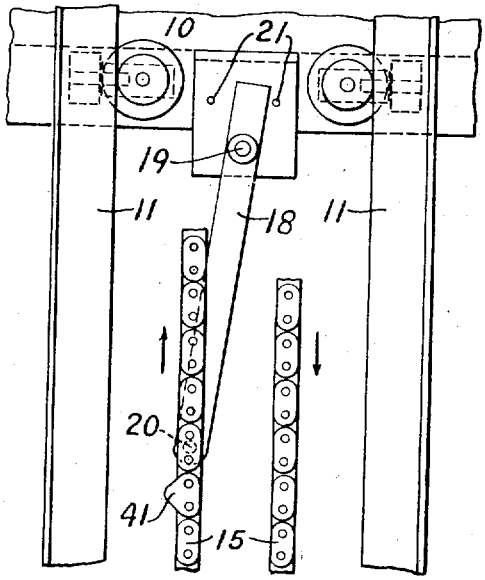
Fig. 5 is a fragmentary rear view showing the connecting rod and stops.
Figure 6:
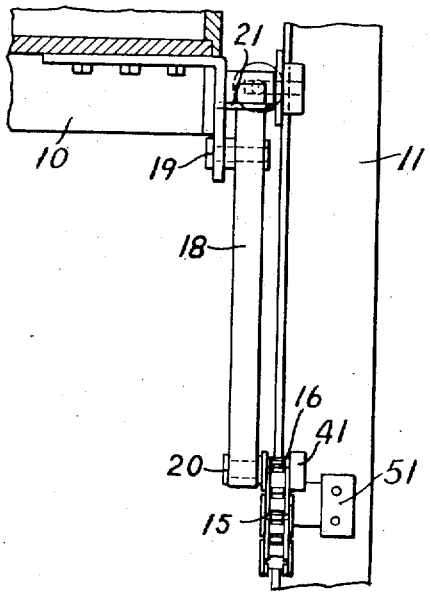
Fig. 6 is a fragmentary edge view showing the upper sprocket and driving chain.
Figure 7:
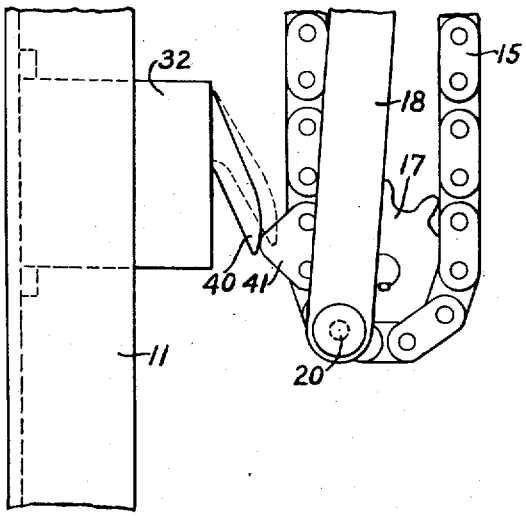
Fig. 7 is a fragmentary detail showing the lower sprocket with the limit switch.

Under normal circumstances if we assume the car to be at the bottom of the shaft as shown in Figs. 1, 2 and 7, the condition of the switches would be as follows: The entrance or control switch 47 will be closed; the starting switches 33 and 34 will both be open; the motor switches 30 and 31 will both be open; the limit switch 32 will be open; the emergency switches 45 and 46 will both be closed, and we will assume both door switches 43 and 44 to be closed. To start the car we will assume switch 33 to be closed. Current will then flow from the right hand side of the line through the switch 33 and the magnet coil 27 to the left hand side of the line. The magnet is thus energized and draws down the core 28 which releases the brake to permit the motor to operate and closes the switches 30 and 31 and thus completes a shunt through the motor 22. As soon as the motor starts to turn, the chain 15 carries the actuating cam 41 out of the path of movement of the switch actuator 40 so that the switch 32 is automatically snapped on thus closing the circuit around the switch 33 so that when switch 33 is released the motor continues to operate.

It will be noted that when the car is at rest at the lower landing, the connection 20 is above the lowest point on the sprocket 17. Thus the weight of the car tends to start the movement of the chain when the brake is released.

It will also be noted that the load is applied gradually as the pin 20 rises around the sprocket so that the motor has time to get up speed before the full load is applied. In fact the load assists the motor in starting and thus eliminates starting jerk. By the use of counterweights I can balance the weight of the car so as to reduce the load on the motor to a minimum.

Figure 8:
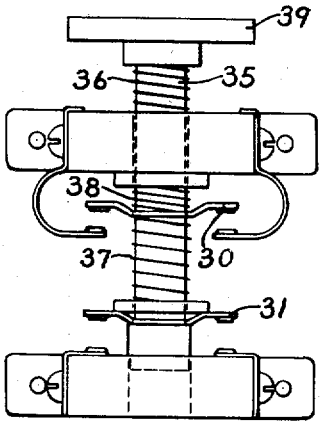
Fig. 8 is a detail view of the motor control switch.
Figure 9:
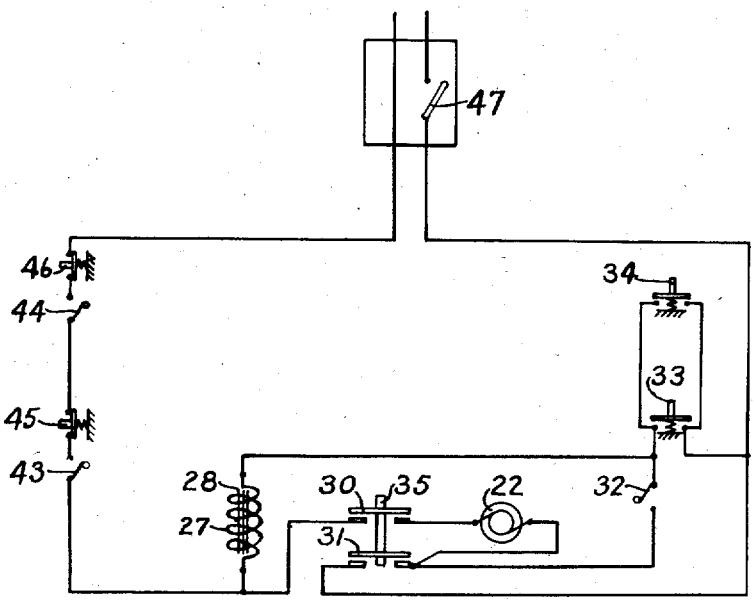
Fig. 9 is a wiring diagram showing an illustrative hook-up for controlling the motor and brake.

When the chain has driven the car to the upper floor, the cam 42 engages the switch actuator 40 just as the connection 20 passes the highest point on the upper sprocket 16. This opens the circuit through the limit switch 32 and de-energizes the magnet coil 27, thereby releasing the core 28. The spring 36 (Fig. 8) then opens the motor switches 30 and 31; and the spring 26 closes the brake shoes 24 against the brake drum 23, thus promptly arresting the motor, the chain and the car, and leaving the weight of the car on the down side of chain 15.

From the foregoing description it will be seen that if either door is opened while the car is in motion it will break the magnet and motor circuits and stop the motor and car immediately in the same manner as the automatic opening of the switch 32.

If at any time while the car is in motion it is desired to stop it, one of the push buttons 45 or 46 may be operated to open the circuit in the same manner as above described. The invention particularly lends itself to a unit assembly for factory production and installation by simple erection on the job. For this purpose the guide rails 11 may be connected by a number of cross bars such as 50 and 51 and 52 so as to constitute a framework.

The motor, brake and electro-magnetic switches may be secured to the bottom cross bar or plate 50. The various other switches may be carried by the uprights. The upper sprocket may be carried by the cross bar 51. Such an arrangement ensures proper factory inspection and alinement.

One of the advantages of this arrangement is that no overtravel of the car is possible. It is therefore unnecessary to provide extra clearance space above or below the car. I also avoid the need of safety or so-called overtravel cut-out switches.

While I have shown and described the preferred construction and arrangement, I wish it understood that the invention is not limited to the particular construction or to the circuit arrangements except as required by the claims and that many features of the invention may be applied to other uses although it is especially adapted to the control of vertically movable devices.

Although I have shown and described apparatus designed to serve two landings, it should be understood that the car can be stopped at any number of intermediate stations or levels.

I claim:

1. A dumb waiter construction comprising a vertically movable car, a chain for raising and lowering the car, guides for said chain, a motor for driving said chain, a rod connecting the car and the chain, a cut-out switch for the motor and cams carried by the chain for actuating said switch, said cams and said connecting rod being arranged with respect to the switch so as to stop the motor while the weight of the car is on a descending branch of the chain so that gravity will assist in starting the motor.

2. A hoisting construction embodying a car, upper and lower sprockets, a driving chain operating on said sprockets, guides for confining the car to vertical movement, a connecting rod hinged to the chain and connected to transmit power from the chain to effect movement of the car, an electric motor for driving said chain in one direction only, a brake for stopping the motor, and a single electro-magnetic switch mechanism actuated by movement of the chain for operatively de-energizing the motor and applying the brake to stop the mechanism while the point of connection between the rod and the chain is on one of the respective sprockets so as to permit the load to be applied gradually to the motor when it is restarted.

3. A hoisting construction including a vertically movable car, guides for confining the car to vertical movement, a driving chain, a rod hinged to said chain and connected to transmit power from the chain to effect raising and lowering of the car, an electric motor for driving said chain, a switch operable to control stopping of the motor, and two cams carried by the chain spaced apart from each other for actuating the switch to stop the motor when the car is at its lower loading level and also for stopping the motor when the car is at its upper loading level, said rod being disposed in such a position when the car is at either of said loading levels as to permit the weight of the moving load to aid in starting the motor gradually.

4. A hoisting construction comprising a vertically movable car, a chain having an ascending and a descending branch for raising and lowering the car, guides for said chain, a motor for driving said chain in one direction only, a cut-out switch for the motor, a brake controlled by the switch for stopping the motor, and a cam carried by the chain for actuating said switch and applying the brake, said cam being arranged with respect to the switch so as to operatively de-energize the motor and apply the brake to stop the car while the weight of the moving load is applied to the chain in the same direction as the power of the motor so that gravity will assist in starting the motor when the brake is released.

5. Hoisting apparatus comprising upper and lower sprockets, an electric motor for driving one of said sprockets, a chain connecting said sprockets, a device to be raised and lowered, lateral guides for said device, a connecting rod pivoted to said device and to said chain, stops for limiting the lateral movement of said rod, a switch for controlling the motor, and a cam movable in coordination with said device for actuating the switch to operatively de-energize the motor, the point of connection between the rod and the device being located between the two runs of the chain.

6. Hoisting apparatus comprising a car, a chain having guiding means at upper and lower points, an electric motor for driving said chain in one direction, brake mechanism for stopping the motor, switch mechanism operable to effect opening of the motor circuit, means of connection between said car and said chain, and means movable in coordination with the car for actuating the switch to stop the motor while the weight of the moving load is applied to said chain in the same direction as the power of the motor.

7. Hoisting apparatus comprising a car, upper and lower guides, a chain traveling on said guides and connected to said car for raising and lowering the same, an electric motor for driving said chain in one direction only, an electro-magnet including an armature movable in response to energization of the electro-magnet, a normally open starting switch adapted to close a circuit through said magnet, brake mechanism for stopping the motor, said armature being mechanically connected with the brake for releasing the same when the electro-magnet is energized, switching means adapted to be closed when the electro-magnet is energized, a circuit through said switching means and the motor so that the motor is energized when the magnet is energized, and an automatic switch adapted to close and maintain a circuit through the electro-magnet as soon as the brake is released and the car starts to move.

8. A hoisting construction comprising a device to be raised and lowered, guides therefor, an endless chain for moving the device on the guides, direction reversing supports for said chain, a motor for driving said chain, means connecting the device and the chain, a cut-out switch for the motor, and cams carried by the chain for actuating said switch, said cams and said connecting means being arranged with respect to the switch so as to stop the motor while the weight of the moving load is applied to the chain in the same direction as the power of the motor so that gravity will assist in starting the motor and the resistance of the load will be applied gradually as the motor starts to rotate.

9. A power construction embodying a carrier, two spaced sprockets, a driving chain operating on said sprockets and connected to the carrier, guides for confining the movement of the carrier to reciprocation in a straight-line an electric motor for driving one sprocket and said chain in one direction only, and a single electro-magnetic switch mechanism actuated by the movement of the chain for stopping the carrier at two predetermined points.

10. Power apparatus comprising two spaced rotary guide means, an electric motor for driving one of said rotary guide means, an endless chain connecting said rotary guide means, a device to be raised and lowered, a connecting rod pivoted to said device and to said chain, guides for confining the movement of the device to straight line reciprocation, stops for limiting the movement of said rod to prevent spreading of the chain, a switch for controlling the motor circuit, and a cam movable with the device for opening the motor circuit.

11. Power apparatus comprising a carrier, two spaced rotary guide means, a chain traveling on said rotary guide means, an electric motor for driving said chain in one direction only, an electro-magnet, a normally open starting switch adapted to close a circuit through said magnet, brake mechanism for stopping the motor, said mechanism including means to bias the brake to set position, an armature coacting with the magnet for releasing the brake, switching means adapted to be closed when the electro-magnet is energized, a circuit through said switching means and the motor so that the motor is energized when the magnet is energized, and an automatic switch adapted to close and maintain a circuit through the electro-magnet when the brake is released and the carrier starts to move.

12. An elevator system comprising a car, guides for confining the movement of the car, a continuous chain, a pair of supporting rotary guide means for the chain, an electric motor rotatable in one direction only and geared to one of the rotary guide means to drive the chain in one direction only, means of connection between the chain and the car to permit the car to slide back and forth on the guides as the chain is driven by the motor, a brake for stopping the motor and car, the brake being biased into set position, an electro-magnetic device adjacent the motor for releasing the brake and starting the motor, a switch for opening the circuit of the electro-magnetic device to deenergize it, cam means carried by the chain to actuate said switch and permit the brake to stop the motor when the car is at the opposite ends of the guides respectively, and a manually actuated switch and circuit connections for energizing the electro-magnetic device to release the brake and start the motor.

13. A dumb waiter construction comprising a car, a chain connected to said car for driving the same, means for confining the car to vertical movement, a motor for driving said chain, a single switch, and spaced cams carried by the chain for actuating the switch to stop the motor when the car is at a lower level and also for stopping the motor when the car is at an upper level.

14. An elevator construction comprising a carrier, an endless chain connected to the carrier to move the same between upper and lower landings, means for confining the carrier to reciprocatory movement, a motor for driving the chain in one direction only, switching means to control the energization of the motor, and a pair of spaced cam means carried by the chain for successively actuating said switching means to automatically stop the carrier when it reaches the upper landing and also when it reaches the lower landing.

BJARNE HENRICKSEN.